(12) United States Patent  (10) Patent No.: US 6,989,841 B2
Docherty  (45) Date of Patent: Jan. 24, 2006

(54) VISUALIZATION METHOD FOR THE ANALYSIS OF PRESTACK AND POSTSTACK SEISMIC DATA

(75) Inventor: Paul Docherty, Richmond, TX (US)

(73) Assignee: Fairfield Industries, Inc., Sugar Land, TX (US)

( * ) Notice: Subject to any disclaimer, the term of this patent is extended or adjusted under 35 U.S.C. 154(b) by 305 days.

(21) Appl. No.: 09/866,949

(22) Filed: May 29, 2001

(65) Prior Publication Data

US 2002/0180732 A1  Dec. 5, 2002

(51) Int. Cl.
G09G 5/00 (2006.01)
G01G 1/00 (2006.01)
(52) U.S. Cl. ......................... 345/629; 702/14
(58) Field of Classification Search .................. 702/14, 702/16; 345/429, 621
See application file for complete search history.

(56) References Cited

U.S. PATENT DOCUMENTS

| | | | |
|---|---|---|---|
| 4,764,904 A * | 8/1988 | Salomonsen et al. | 367/70 |
| 5,083,297 A * | 1/1992 | Ostrander | 367/36 |
| 5,136,550 A * | 8/1992 | Chambers | 367/38 |
| 5,432,895 A | 7/1995 | Myers | |
| 5,596,547 A * | 1/1997 | Bancroft et al. | 367/51 |
| 5,671,344 A | 9/1997 | Stark | |

(Continued)

OTHER PUBLICATIONS

Clapp et al., AVS as a 3-D seismic data visualizing platform, May 11, 2001, pp. 1-10.*

(Continued)

*Primary Examiner*—Sumati Lefkowitz
*Assistant Examiner*—Scott Wallace
(74) *Attorney, Agent, or Firm*—Jackson Walker L.L.P.; Mark A. Tidwell, Esq.

(57) ABSTRACT

A method for presenting seismic data in a multidimensional visualization. Specifically, in the visualization technique of the current invention, seismic data is displayed in a multi-dimensional plan view utilizing at least four dimensions associated with the seismic data, such as for example, x, y, time/depth and offset. In the method of the invention, a plurality of time or depth windows are defined along a reflector or any other time or depth surface of interest on the prestack data as presented in standard CMP displays. In one embodiment of the invention, for each CMP gather, a window is defined around the data representing the reflector of interest. Passing through each window are individual seismic traces. The window, being defined on the seismic display, is associated with a finite time/depth segment and will contain several offsets. In addition, since each CMP gather has a constant x and y coordinate, the window is associated with specific spatial coordinates. These spatial coordinates are used to plot the window on an x-y plan view. Each window represents a segment of the seismic data associated with a reflector or other time/depth window. The data within each window can be analyzed to determine such things as, for example, the accuracy of the particular velocity model selected for data processing methods, such a migration. Furthermore, as multiple windows are plotted on the plan view, trends in the data become more prevalent to an observer. The resulting multidimensional plan view thereby permits presentation of the data utilizing at least four dimensions of the data. In another embodiment, additional information can be extracted from the multidimensional plan view by overlaying this plan view on additional representations of the data, such as for example, the underlying seismic structure. In addition, the visualization techniques could be used on poststack data to visualize several stacked traces around a point of interest.

8 Claims, 9 Drawing Sheets

U.S. PATENT DOCUMENTS

| | | | |
|---|---|---|---|
| 5,930,730 A | | 7/1999 | Marfurt et al. |
| 6,012,018 A | | 1/2000 | Hornbuckle |
| 6,049,759 A | * | 4/2000 | Etgen .......................... 702/14 |
| 6,141,622 A | * | 10/2000 | Keller et al. .................. 702/16 |
| 6,215,499 B1 | | 4/2001 | Neff et al. |
| 6,839,658 B2 | * | 1/2005 | Causse et al. .............. 702/182 |

OTHER PUBLICATIONS

Margrave et al., The theoretical basis for prestack migration by equivalent offset, 1996, pp. 1-19.*

Wille, Immersive environments enhance team collaboration, May 1999, pp. 1-3.*

Ervin, An object-oriented approach to Landscape Visualization, Mar. 1993, pp. 1-7.*

Mobil Oil Canada, Ltd.; An Introduction to Seismic Interpretation; p. 79, Paragraph 5.9, Reporting and management presentations and Fig. 5/9: Isometric projection of a Devonian reef surface in Western Canada.

* cited by examiner

VISUALIZATION METHOD FOR THE ANALYSIS OF PRESTACK AND POSTSTACK SEISMIC DATA

BACKGROUND OF INVENTION

1. Field of the Invention

The present invention relates to the field of seismic exploration and, more particularly, to a method for visualizing prestack seismic data in plan view (map view) to determine such things as, for example, velocity field accuracy. The invention also relates to the overlay of prestack seismic data in plan view on a contour map of other data such as, for example, a geologic structure map, to visualize the correlation between structural characteristics and various other seismic measurements such as, for example, accuracy of the velocity model or amplitude variation with offset response.

2. Description of the Prior Art

In the oil and gas industry, seismic prospecting techniques are commonly used to aid in the search for and evaluation of subterranean hydrocarbon deposits. Typically, the goal of seismic prospecting is to construct a two dimensional (2-D) or three dimensional (3-D) representation of a subsurface lithologic formation in order to identify features that are indicative of hydrocarbon accumulations. Seismic prospecting generally consists of three separate stages, namely data acquisition, data processing, and data interpretation. The success of a seismic prospecting operation depends on satisfactory completion of all three stages.

In the first stage of seismic prospecting, seismic acquisition, a seismic source is used to generate a seismic signal that propagates into the earth and is partially reflected by subsurface seismic reflectors (i.e., interfaces between subsurface lithologic or fluid units having different elastic properties). The reflected signals (known as "seismic reflections") are detected and recorded by seismic receivers located at or near the surface of the earth, thereby generating a seismic survey of the subsurface. The recorded signals, or seismic energy data, can then be processed to yield information relating to the lithologic subsurface formations identifying such features, as, for example, lithologic subsurface formation boundaries. The seismic energy recorded by each seismic receiver during the data acquisition stage is known as a "trace".

Once the seismic data has been acquired, it is then processed during the second stage of seismic prospecting so that the traces will accurately represent the subsurface. This processing typically involves the use of various mathematical algorithms that are applied to the data to enhance its signal content and generally make it more amenable to interpretation. One of the main objectives of the data processing stage is to remove or at least attenuate unwanted recorded energy that contaminates the primary seismic signal. This unwanted energy is typically referred to as "noise", and represents such things as, for example, spurious energy traveling through the formation other than primary signal. Through processing, the strength of the primary signal energy represented in a trace can be enhanced, while the strength of the unwanted noise energy can be weakened, thus increasing the signal-to-noise, or S/N, ratio.

One method for attenuating unwanted noise components in seismic data traces is through the common-midpoint (CMP) "stacking" process. As is well known to persons skilled in the art, the "midpoint" for a seismic data trace is a point generally close to midway between the seismic wave source location and the receiver location of the trace. The distance between a source and receiver is referred to as trace offset or offset distance. Generally, prestack seismic data traces at the same subsurface position are referred to as being in a common midpoint (CMP) sort before migration and in a common reflection point (CRP) sort after migration. The same nomenclature is applicable to stacked traces. Also, after depth migration the prestack data are referred to as image gathers. According to the CMP method, the recorded seismic data traces are sorted into common-midpoint groups, called gathers, each of which contains a number of different seismic data traces having the same midpoint but different source-to-receiver offset distances. CMP gathers for a particular point are summed or "stacked" together yielding a single stacked data trace for the point, this trace being a composite of the individual seismic data traces in the CMP gather. Through stacking of CMP traces, the unwanted energy on any one trace is reduced when the trace is added with other CMP traces, such that the desired energy is enhanced. Typically, the stacked data trace has a significantly improved signal-to-noise ratio compared to that of the unstacked seismic data traces.

Prior to stacking, the seismic data traces within each CMP gather also may be corrected for various effects, such as, for example, normal moveout (NMO). NMO is the increase in reflection time of a trace due to an increase in the offset distance between the source and the receiver detecting the signal. As described above, in a CMP gather, each trace generated by a source-receiver pair has an offset that is the distance from the source to the receiver, an azimuth that is the compass direction between the source and receiver, and a midpoint approximately halfway between the source and receiver. As the traces for a CMP gather are plotted adjacent to one another, the reflector along the various traces appears at later points on the time scale because of the longer offsets as the shot and receiver move apart, resulting in a downward curving hyperbolic pattern characteristic on the plot. The time-domain effect of varying offset must be taken into account in the CMP stack process in order for the signal portions of traces of varying offset to properly align and provide an accurate indication of the depth of the reflector. This is typically accomplished by way of "NMO correction" in which the traces corresponding to source-receiver paths of various lengths are time-shifted relative to one another so that their detected reflection events are aligned in time. The amount of the time shift for a given trace will, of course, depend upon the offset distance of that trace. It will also depend upon the velocity with which the acoustic energy travels in the strata along the shot-receiver path. NMO correction therefore requires the estimation or determination of a velocity, commonly referred to as the "stacking velocity", for deriving the necessary time shift as a function of offset.

Another correction that is commonly made to the seismic data is called migration, wherein the seismic data is adjusted to account for such things as, for example, misplacement of reflectors due to structural dip, diffraction hyperbolas generated by such things as fault terminations etc. As is well known to persons skilled in the art, in the presence of reflector dip the reflection point from a reflector will not be at the midpoint between the source and receiver. Migration is the process that positions the data correctly. Also, point sources in the subsurface such as fault terminations generate seismic energy in the form of diffraction hyperbolas. These diffraction hyperbolas are collapsed to the point source by the migration process.

With these various correction techniques in mind, it is generally well known in the field of seismic exploration that prestack seismic data can be used for several purposes in the processing and interpretation stages of the seismic process. For example, one such purpose is to determine the accuracy of the velocity model used for either the NMO correction, time migration or depth migration. Another example is the use of prestack seismic data to estimate the lithologic and fluid properties of the subsurface based on the amplitude variation with trace offset (AVO) seen on a reflector.

In any event, whether the data is stacked or unstacked, during the data processing stage, as well as the data interpretation stage, the data is often presented graphically or pictorially to ascertain the effects of data corrective efforts and to identify various characteristics of the data. A pictorial representation of the data might be a 2-D poststack section, a 3-D cube, a contour map of the lithologic structure or a 3-D perspective plot of the subsurface.

Seismic traces for a particular point, or more specifically CMP or CRP gathers, are most often illustrated as shown by the graphical presentations, called "seismic displays", of FIGS. 1 and 2. As shown, individual traces or individual CMP or CRP gathers are displayed with the vertical axis being time. For velocity analysis, the control used to determine the accuracy of the velocity model is the "flatness" of the reflectors within the CMP or CRP gather. That is, how well the particular reflector stays at a constant time value across all trace offset values within the CMP or CRP gather. The CMP gather in FIG. 1 does not have the NMO correction applied, while FIG. 2 shows the same CMP after the NMO correction has been applied. The flatness of the reflectors is an indication of the accuracy of the velocity model used for the NMO. In addition, the flatness of the reflectors after prestack time or depth migration provides a control on the velocity field used for the migration.

While graphical presentations such as FIGS. 1 and 2 are useful in ascertaining the accuracy of a velocity model or field, the data is presented in only two dimensions, such as for example, time and offset. However, a presentation of data encompassing additional dimensions, referred to as visualization for purposes of this patent, allows processors to develop better understandings of the correlation between related data and thereby derive a better overall understanding of the lithologic properties of the subsurface from which the data is derived. The prior art is replete with teachings of visualization methods for poststack seismic data.

FIG. 3 illustrates a typical 3-D view of a lithologic surface such as is commonly used in seismic interpretation. FIG. 4 illustrates a 3-D perspective view of a seismic contour map for a lithologic structure where the contour lines would represent contours of equal time of depth. Very closely spaced contour lines illustrate the areas of faulting over the larger structure. Also shown in FIG. 4 are representative arrows that might correspond to data analysis points for such things as velocity determination.

In either graphical or pictorial presentations of data, it is well known in the prior art to employ a gray scale or color display to indicate a particular parameter of the data, such as, for example, instantaneous amplitude, instantaneous frequency, weighted frequency, etc. It is also possible to use the color or gray scale gradation as a display technique for AVO attributes such as, for example, intercept, gradient, fluid factor, etc. FIG. 5 is an illustrative example where the gray scale corresponds to amplitude of the stacked data. Such displays give a parameterization of data but do not display the underlying data itself.

The following patents are representative of seismic visualization techniques in the prior art. U.S. Pat. No. 6,215,499 teaches a method for projecting poststack 3-D data onto curved surfaces. U.S. Pat. No. 6,141,622 teaches the display of a semblance parameter or attribute obtain from a time and spatial data cell. U.S. Pat. No. 6,012,018 teaches the derivation of a seismic attribute from processed, e.g. stacked, seismic data and correlating the seismic attribute to a specific physical characteristic of the subsurface region.

U.S. Pat. No. 5,930,730, teaches a visualization method utilizing a 2-D color map wherein multiple parameterizations of a 3-D dataset such as semblance, true dip azimuth, and true dip estimates are mapped to correspond to one of the three variables of hue, saturation and lightness. This would allow the interpreter to visualize multiple parameterizations on a single 2-D map.

U.S. Pat. No. 5,671,344 teaches a method of generating surface slices through a 3-D volume, wherein visualization of data from the 3-D volume is made along a surface within the volume, such as a lithologic formation boundary.

U.S. Pat. No. 5,432,895, teaches a virtual reality imaging system in which a user can view objects and phenomena within a multidimensional space, from a user defined point or along a user defined path.

Thus generally the prior art focuses on visualization techniques for poststack data. In any event, whether poststack or prestack, one drawback to the methods of the prior art is that data characteristics are lost as data is condensed into a single number or attribute, such as coherence or variance. While this attribute may be mapped, either by color, on a gray scale or by number, the process of deriving the attribute distills out information that is more amenable to visualization with the human eye such as, for example, signal to noise characteristics, reflector curvature, etc. Another drawback to these prior art visualization techniques is that they do not provide the geophysicist with the capability to view prestack seismic data in plan view or in conjunction with other displays of seismic data such as, for example, structure maps. Rather, the actual seismic data continues to be displayed vertically as a function of time or depth without additional dimensions that would allow the geophysicist more insight into subsurface characteristics.

It is therefore desirable for a processor or interpreter to use visualization techniques to do such things as, for example, view data in a multidimensional plan view during the creation of a velocity model to determine areas of adequate and inadequate velocity determinations. Such a method would permit visualization of a seismic survey simultaneously across the surface of a structure, particularly in the case of prestack data. It would also be desirable for such persons to view this prestack data in conjunction with the subsurface structure with which the data is associated utilizing a method that could yield a correlation between the seismic data and the subsurface structure from which the data is extracted. For example, an AVO anomaly associated with structural closure such as a fault termination would be more prospective than an AVO anomaly without any structural closure. Thus, such capabilities would be desirable in order to view the effect of changes in parameters such as velocity field accuracy and AVO response.

SUMMARY OF INVENTION

These and other objectives are achieved through a method for presenting prestack seismic data in a multidimensional visualization. Specifically, in the visualization technique of the current invention, seismic data is displayed in multidimensional plan view. Such multidimensional plan view displays data in at least four dimensions, such as for example, x, y, time/depth and offset. Furthermore, additional information can be extracted from this view by overlaying this view on additional representations of the data, such as for example, the underlying seismic structure. In the method of the invention, a plurality of time or depth windows are defined along the reflector of interest on the prestack data as presented in the standard CMP displays. For each window, the data is then presented in multidimensional plan view. Each window represents a time or depth portion of the seismic data surrounding the reflector. As adjacent windows are presented in multidimensional plan view, trends in the data become much more apparent than from the individual prestack seismic displays such as shown in FIGS. 1 and 2. If a reflector portion within a window is substantially flat, this is indicative that the corresponding velocity model for that window of data is accurate. However, if the reflector portion within a data window curves up or down, this is an indication that the velocity model for that portion of the data is not accurate and that a new velocity model should be utilized for either the NMO connection or the migration velocity field.

In another embodiment, the multidimensional plan view of the current invention can be overlaid on other representations of the subsurface, such as a subsurface structure. As another example, the multidimensional plan view can be overlaid with any standard plan view representation of the seismic data, such as for example, instantaneous attribute plots, thereby correlating trends in the multidimensional plan view with seismic characteristics in the standard plan view.

DESCRIPTION OF THE PREFERRED EMBODIMENT

Figure 1:
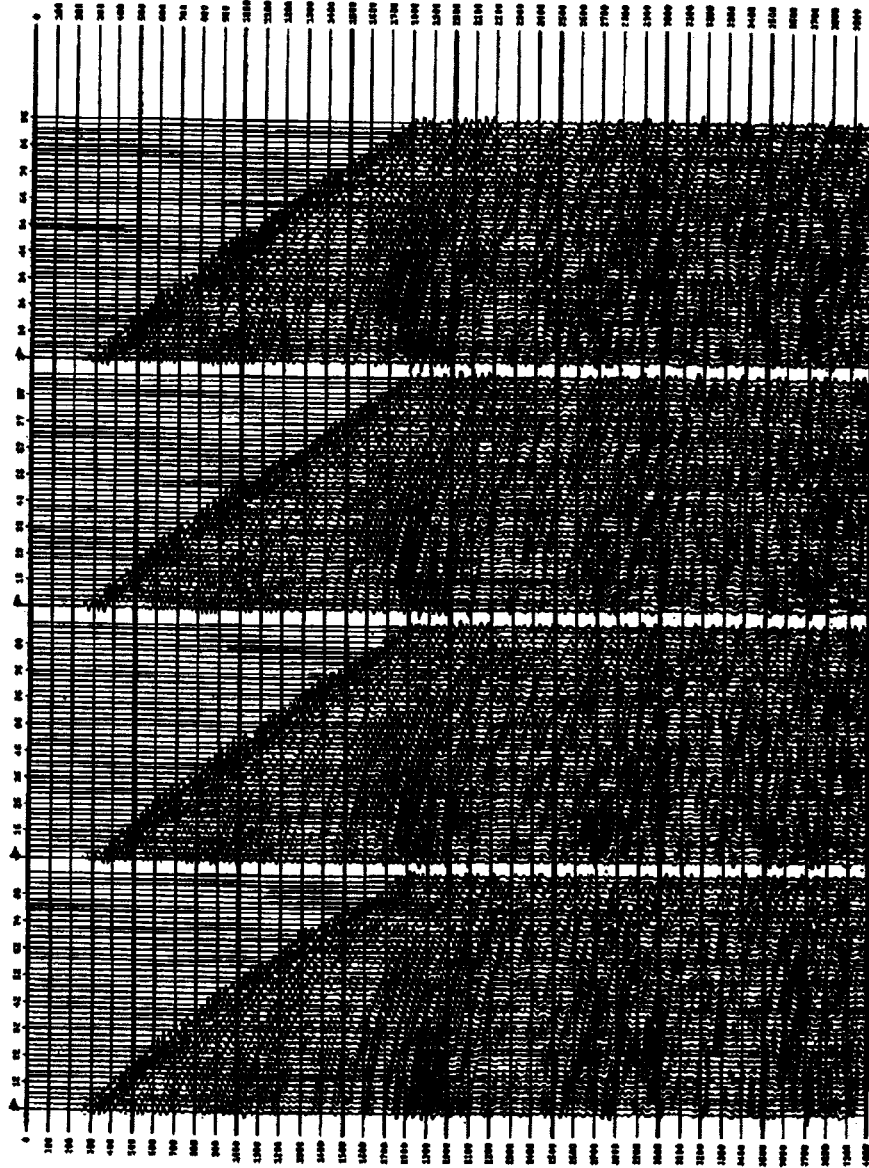
FIG. 1 is typical display of prestack data without NMO correction.
Figure 2:
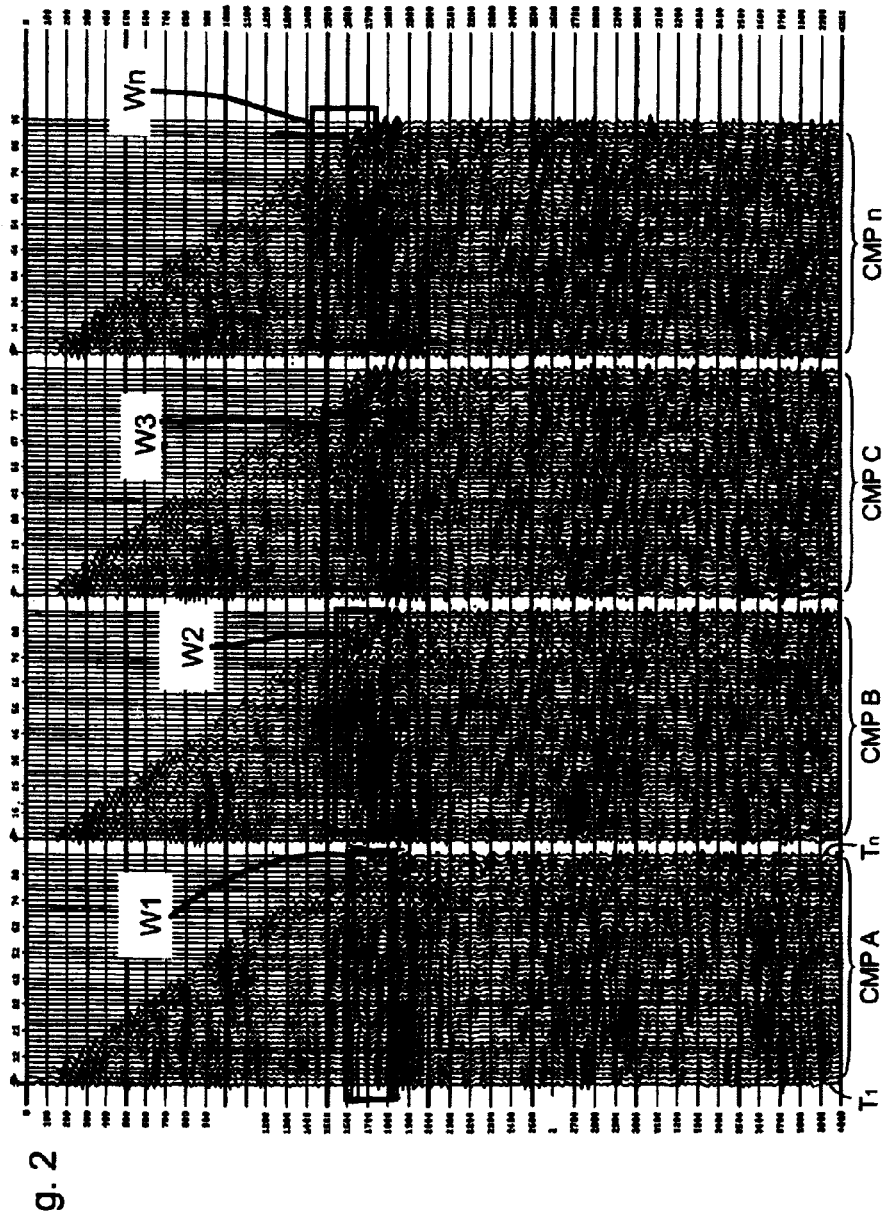
FIG. 2 is typical display of prestack data with NMO correction.
Figure 3:
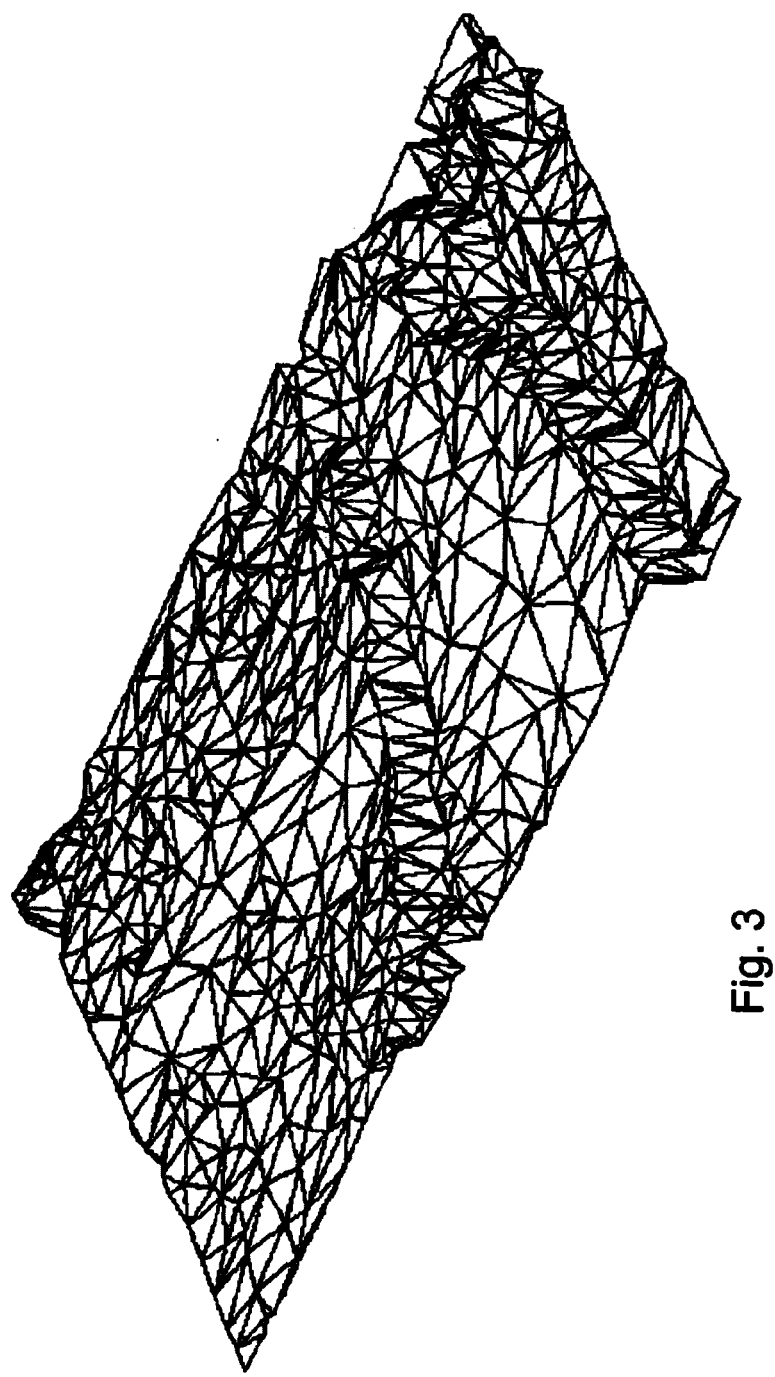
FIG. 3 is an illustrative example of a seismic structural map.
Figure 4:
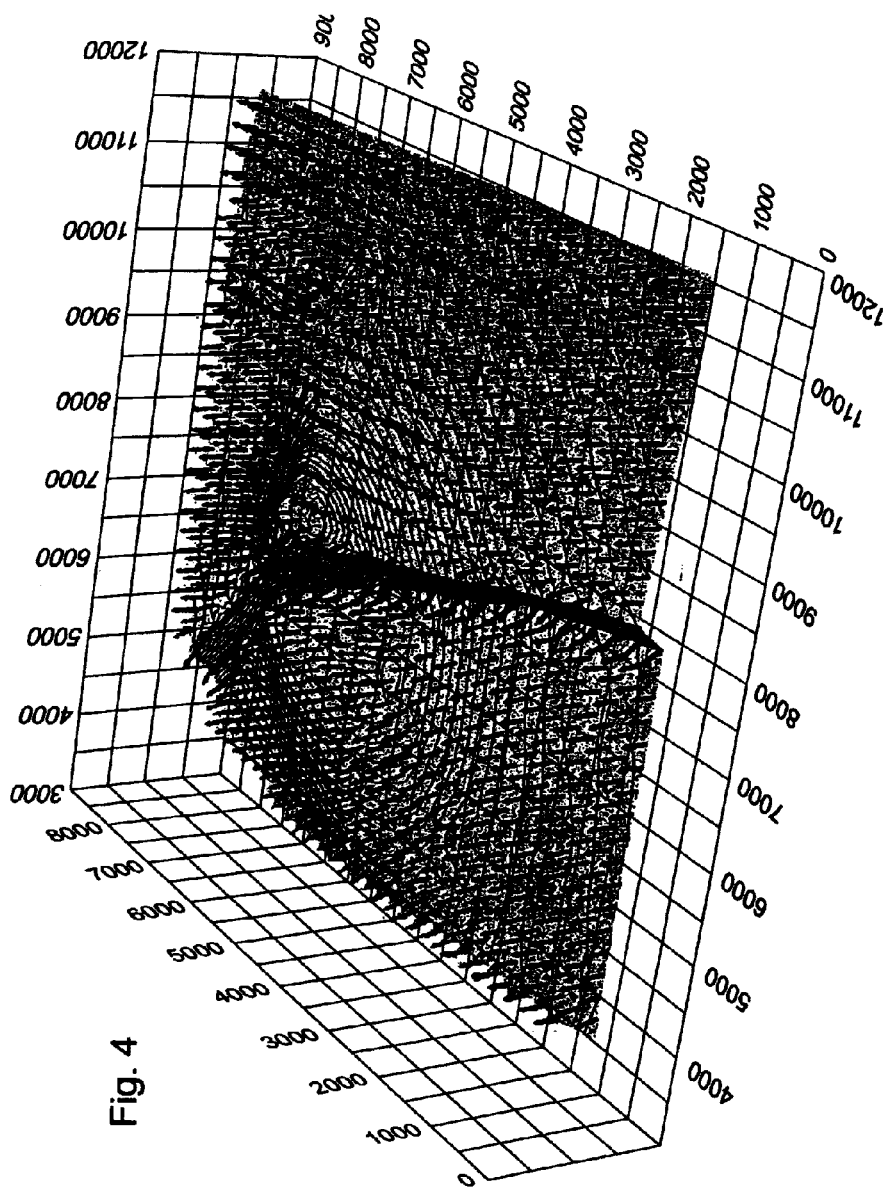
FIG. 4 is a perspective view of a seismic structure map with elevation contour lines and analysis points.
Figure 5:
FIG. 5 is a gray scale map of a seismic attribute.

The method of the invention is best described with initial reference to FIGS. 1 and 2. In FIG. 2, NMO corrected, prestack data is illustrated in a typical seismic display. As discussed above, this data is presented in a seismic display wherein the seismic data is plotted as a function of time and offset, i.e., the vertical axis is time and the horizontal axis is offset. However, each of the four panels illustrated in FIG. 2 is associated with a particular point in space, such that the x-coordinate and the y-coordinate are held constant. Thus, while the data is presented in a two-dimensional display of time and offset, each panel has two implicit additional dimensions, namely the x and y coordinates, associated with it. The method of the invention is to create a plan view that presents the data in at least a four dimensional representation utilizing these additional coordinates associated with a time-offset or depth-offset data set.

Specifically, a plurality of time or depth windows $W_1$–$W_n$ are defined in the data of FIG. 2 along the reflector wherein a single window W is defined at each CMP. For example, FIG. 2 illustrates a time window $W_1$ defined on the data between 1760 and 1840 milliseconds at CMP A. The position of the window $W_1$ is dictated by the reflector rather than a particular time or depth, thereby permitting a particular reflector to be tracked through changes in time or depth. As mentioned above, this window W of data is associated with a fixed point, i.e., the CMP, having constant x and y coordinates. At CMP B, window $W_2$ might be defined between different times so long as window $W_2$ is defined along the reflector. In any event, passing through window W is a plurality of traces, $T_1$–$T_n$, each of which is converted for presentation in plan view using the trace's x and y coordinates for the particular CMP, the time t or depth d for the window W and the offset distance OD for the data.

Figure 6:
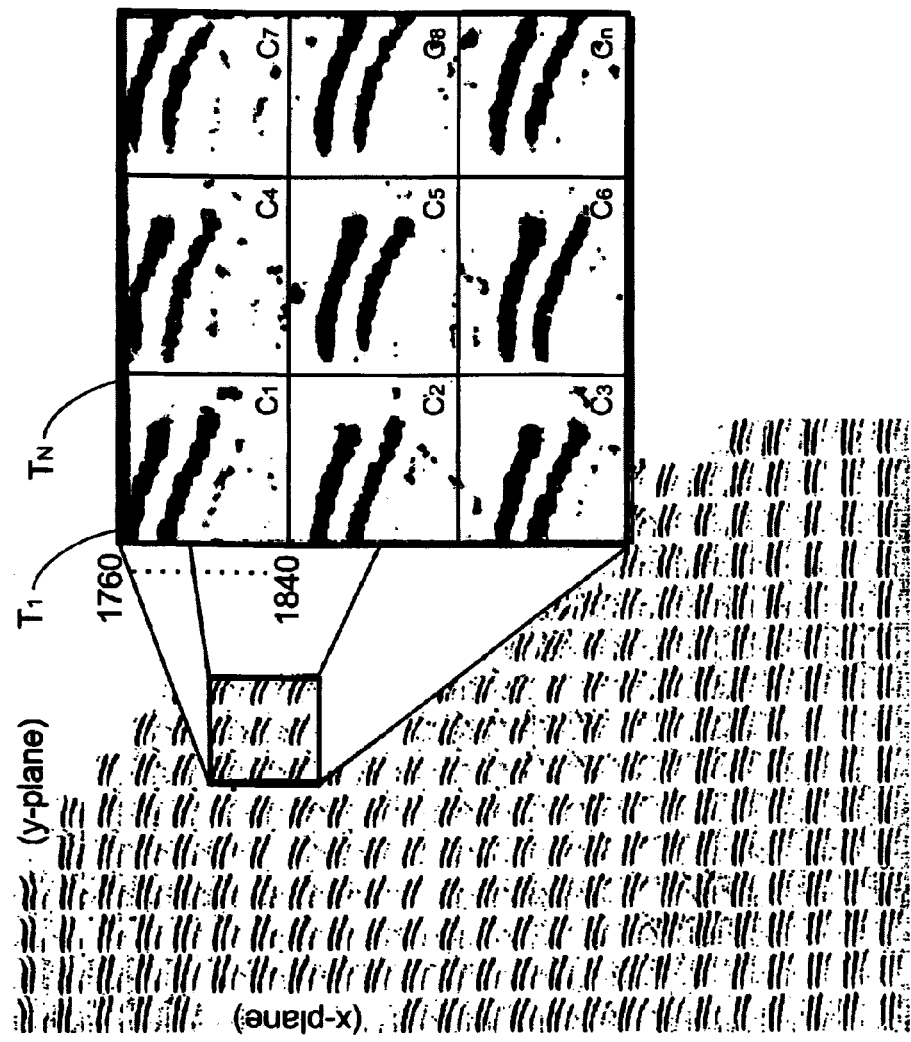
FIG. 6 is a display of prestack data in plan view with an inaccurate velocity model.

With reference to FIG. 6, it is shown how the two dimensional data of FIG. 2 is converted to a multidimensional presentation. As shown in FIG. 6, the multidimensional plan view of the invention is comprised of a plurality of cells, $C_1$–$C_n$. Each cell C in the plan view corresponds to a window W as shown in the seismic display of FIG. 2. Within each cell C is a plurality of seismic traces that likewise correspond to the traces $T_1$–$T_n$ passing through the windows defined in the CMPs of FIG. 2. As such, within each cell $C_1$–$C_n$, the individual traces $T_1$–$T_n$ correspond to a particular time or depth window and a particular offset distance. In other words, window W and its related cell C, represent at least four dimensions of the data, namely the constant x and y coordinate associated with the particular CMP gather in which the window is defined, the time or depth associated with the data in window W and the offset associated with each trace in the window W.

Figure 7:
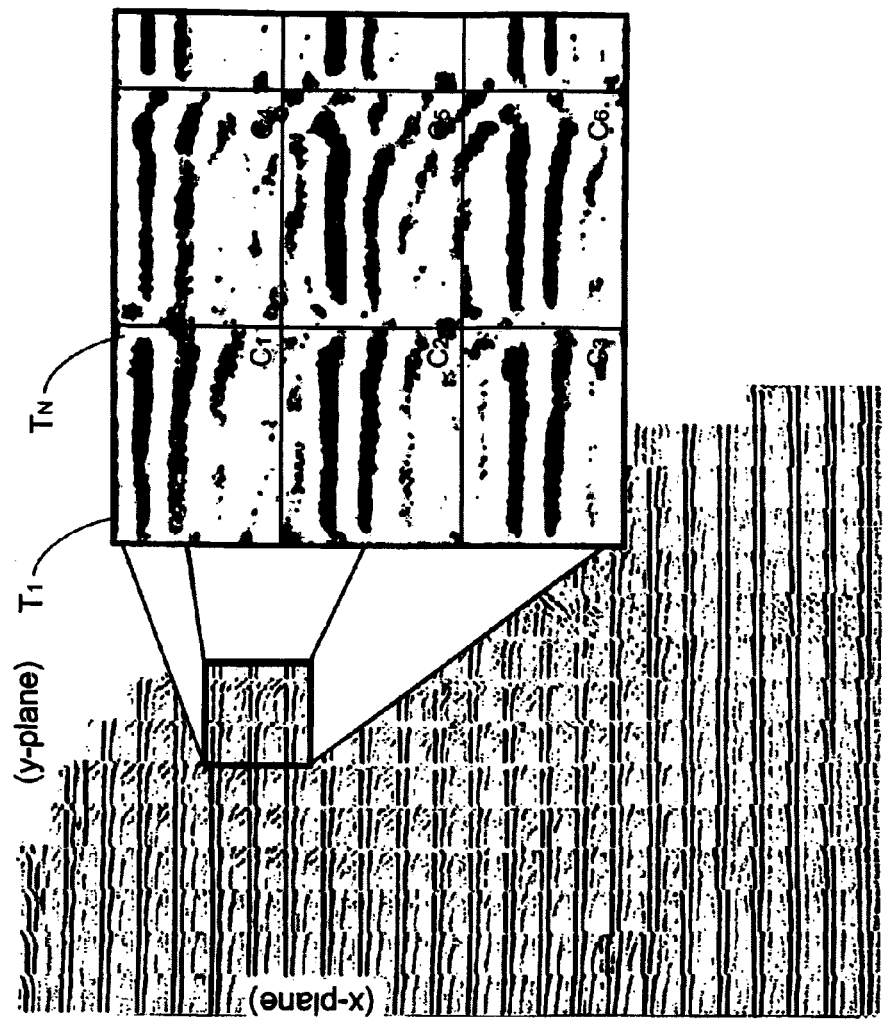
FIG. 7 is a display of prestack data in plan view with an accurate velocity model.

FIGS. 6 and 7 show the multidimensional type of display of the invention utilizing these four dimensions. Specifically, FIG. 6 shows prestack seismic data image gathers, in multidimensional plan view after depth migration with an incorrect initial velocity field. In FIG. 6, the axes of the plan view are based on the x and y coordinates. As mentioned above, the individual cells C correspond to a particular depth window W, for example 400 feet from the top of the window to the bottom, centered on a particular reflector, for example a reflector at 2500 feet in the middle of the area. Thus each cell C would show data from 200 feet above to 200 feet below the reflector with each individual trace T in the cell corresponding to a particular trace offset distance OD, i.e. a particular seismic source to receiver distance. In this plan view, therefore, the cell C can be plotted on the x and y plane utilizing the unique x and y coordinates arising from the cell's related window W defined at a particular CMP in FIG. 2. As such, the window $W_1$, which represented only two dimensions of data in FIG. 2, has been converted to cell $C_1$ and plotted on the plan view in FIG. 6, thereby representing four dimensions. Those skilled in the art will understand that each cell C shown in FIG. 6 is derived from a unique CMP gather, such that only one cell C at a particular x and y coordinate will exist along the reflector. FIG. 7 is also illustrative of a multidimensional plan view such as FIG. 6, but in which the image gathers are plotted after the migration velocity has been corrected, that is, the migration velocity has been adjusted so that after migration the image gathers are "flat" for the reflector being analyzed.

Figure 8:
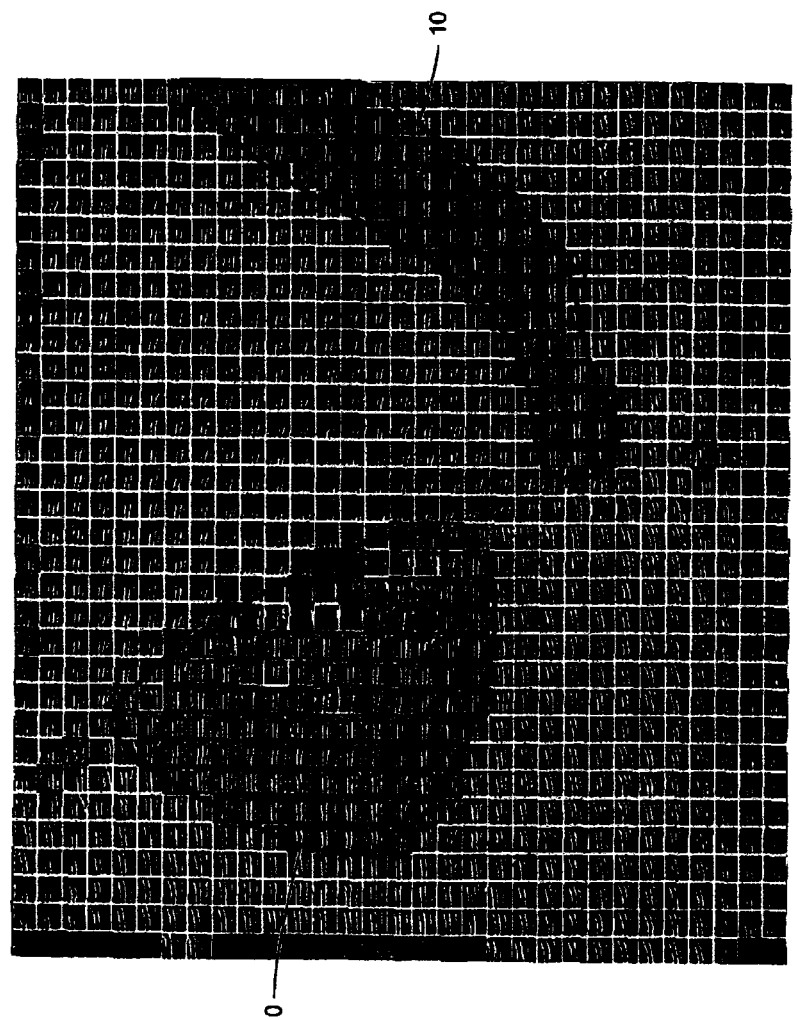
FIG. 8 is a plan view over a larger area of prestack data with an accurate velocity model in places and an inaccurate velocity model in other places.

FIG. 8 illustrates the technique of the current invention applied along a reflector or particular horizon. In other words, there is shown a plurality of the CMP gathers for a reflector converted from a seismic display such as shown in FIG. 2 to a multidimensional plan view. Here again a certain depth window is displayed containing a particular reflector as described above. In this display, areas of adequate velocity determination, i.e., where the reflector data in a cell C appears substantially "flat", have been darkened such as shown at 10. This display provides the geophysicist with the knowledge of which areas for this reflector need the velocity corrected, e.g., those cells C where the reflector data appears to curve up or down. The geophysicist can focus his efforts on the areas where the reflector is not flat on the image gathers.

Figure 9:
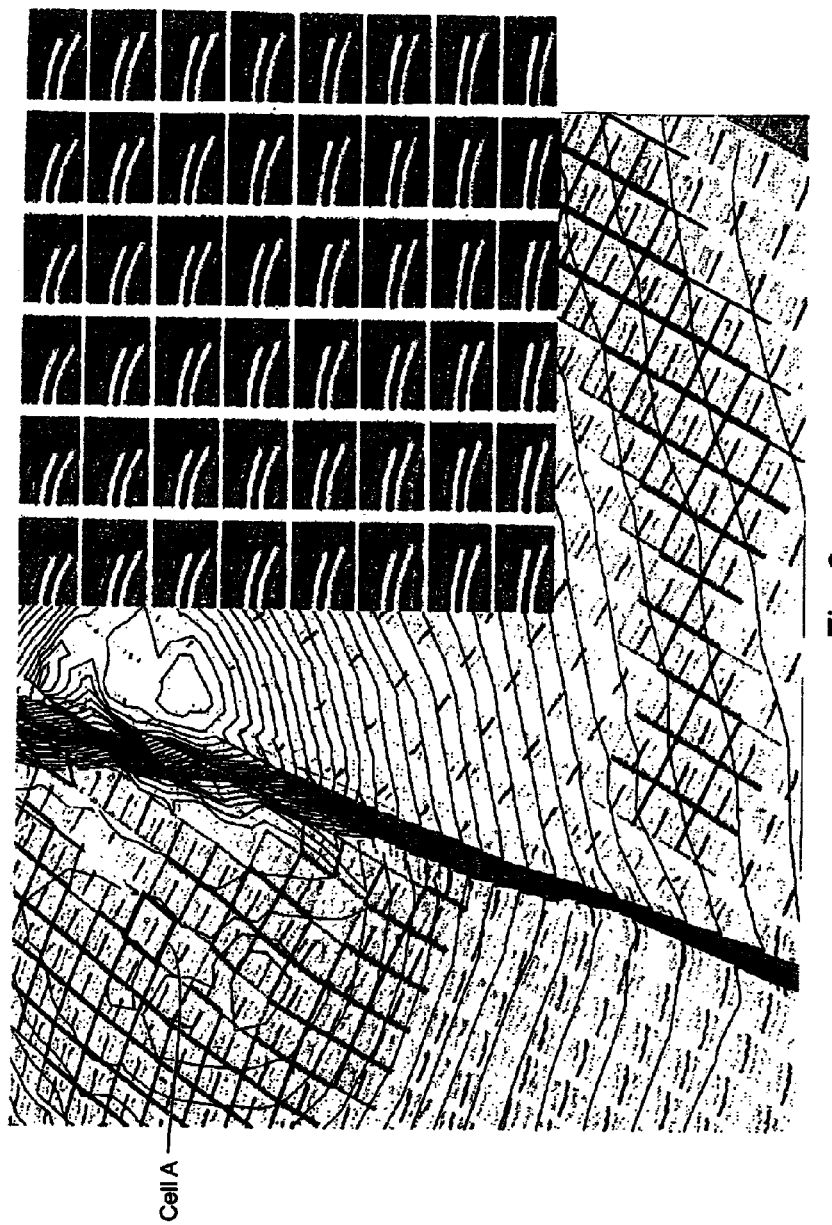
FIG. 9 is an overlay of a plan view of FIG. 8 with a contour map of FIG. 2, thereby illustrating AVO response.

In another embodiment of the invention, as shown in FIG. 9, the multidimensional plan view is overlaid with a contour map, permitting visualization of seismic data in correlation with the related lithologic structure. Particularly in FIG. 9, the overlay display permits one to view an AVO response. An AVO response is seen as a variance in the amplitude of the reflector with trace offset, that is the seismic source to receiver distance. It is well known to those skilled in the art that such changes in amplitude can be indicative of the lithologic or fluid properties of the subsurface. This response is seen in Cell A of FIG. 9 where an increase in amplitude is seen on the displayed reflector from the near to far offsets, i.e. left to right.

Those skilled in the art will understand that still yet another embodiment of this invention is in its use with immersive environments. In these environments the data is projected such that the observer appears to be able to "enter" into the dataset. Such displays are currently in use in the engineering field as in pipeline design. In the geophysical field immersive environments are used to give the interpreter more visualization abilities by "entering into" the dataset. This invention will be useful to such an undertaking because of the ability to see the data in prestack form and hence form an estimate of such things as its signal to noise ratio, the presence of organized noise, etc.

The present invention provides a new method for visualizing prestack seismic data. This method is particularly useful in determining the velocity field needed for prestack depth migration. This visualization technique gives the geophysicist developing the velocity model the ability to see how the correctness of the velocity field varies spatially by presenting the data in at least four dimensions. Additional dimensions in the plan view of the invention can be achieved by presenting the data in gray scale, color or similar other techniques. Furthermore, while the invention has been primarily described with respect to prestack data, those skilled in the art will understand that the technique of the invention is also suitable for use in visualizations of poststack data. For poststack data, instead of each window containing one CMP or CRP with several offsets, the window would contain several poststack traces around a point of interest.

Thus, while specific features and embodiments of the invention have been described in detail herein, it will be readily understood that the invention encompasses all modifications and enhancements within the scope and spirit of the following claims.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for viewing seismic data associated with a seismic area of interest, said method comprising:
   a. generating a prestack seismic display having a plurality of CMP gathers, wherein each gather has constant spatial coordinates associated therewith;
   b. for each CMP gather, defining a time or depth window around seismic data of interest to generate a multidimensional CMP gather utilizing at least four dimensions;
   c. plotting a seismic field representation based on the seismic area of interest; and
   d. overlaying said multidimensional CMP gather on the seismic field representation by plotting said window in plan view using the spatial coordinates associated with said window.

2. The method of claim 1 wherein said seismic field representation is derived from the seismic data.

3. The method of claim 1 wherein the seismic field representation is a contour map.

4. The method of claim 1 further comprising the step of inserting the multidimensional CMP gather into an immersive environment.

5. The method of claim 1 further comprising the steps of analyzing trends in the data segments by viewing multiple segments in spatial relationship to one another.

6. The method of claim 1 wherein said at least four dimensions comprise an x-dimension, a y-dimension, a depth dimension and a fourth dimension for the multidimensional CMP gather and wherein said fourth dimension is based on another seismic attribute of the CMP gather.

7. A method for viewing seismic data related to a lithologic structure comprising:
   a. generating a poststack seismic display having a plurality of poststack traces around a point of interest, wherein each poststack trace has a constant spatial coordinates associated therewith:
   b. for each poststack trace, defining a time or depth window around seismic data of interest to generate a multi-dimensional poststack trace;
   c. plotting said lithographic structure in the form of at least two fields associated therewith; and
   d. overlaying said fields with said multi-dimensional poststack trace by plotting said window in plain view using the spatial coordinates associated with said window.

8. The method of claim 7 further comprising the steps of analyzing trends in the data segments by viewing multiple segments in spatial relationship to one another.

* * * * *